United States Patent [19]

Licht

[11] Patent Number: 4,467,577
[45] Date of Patent: Aug. 28, 1984

[54] INTUMESCENT FIRE BARRIER MATERIAL LAMINATED WITH RESTRAINING LAYER

[75] Inventor: Richard R. Licht, New Richmond, Wis.

[73] Assignee: Minnesota Mining and Manufacturing Company, St. Paul, Minn.

[21] Appl. No.: 396,676

[22] Filed: Jul. 9, 1982

Related U.S. Application Data

[63] Continuation of Ser. No. 154,455, May 29, 1980, abandoned.

[51] Int. Cl.³ .............................................. E04C 2/00
[52] U.S. Cl. .................................. 52/232; 174/48;
428/137; 428/138; 428/239; 428/255; 428/289;
428/428; 428/920; 428/921
[58] Field of Search ............... 428/137, 138, 239, 255,
428/284, 289, 428, 920, 921; 52/232; 174/48

[56] References Cited

U.S. PATENT DOCUMENTS

| | | | |
|---|---|---|---|
| 3,186,888 | 6/1965 | Gaeth et al. | 156/325 |
| 3,259,536 | 7/1966 | Gaeth et al. | 161/206 |
| 3,566,564 | 3/1971 | Gaeth et al. | 52/232 |
| 3,864,883 | 2/1975 | McMarlin | 52/221 |
| 3,932,696 | 1/1976 | Fork et al. | 174/48 |
| 3,934,066 | 1/1976 | Murch | 428/248 |
| 3,995,102 | 11/1976 | Kohaut | 174/48 |
| 4,061,344 | 12/1977 | Bradley et al. | 277/26 |
| 4,136,707 | 1/1979 | Gaillot et al. | 137/75 |
| 4,194,521 | 3/1980 | Banta | 137/67 |
| 4,221,092 | 9/1980 | Johnson | 52/232 |
| 4,232,493 | 11/1980 | Gray et al. | 52/221 |
| 4,232,620 | 11/1980 | Kurz | 112/420 |
| 4,249,353 | 2/1981 | Berry | 52/232 |
| 4,270,318 | 6/1981 | Carroll et al. | 52/1 |
| 4,271,228 | 6/1981 | Foster et al. | 428/281 |
| 4,272,643 | 6/1981 | Carroll et al. | 174/48 |
| 4,273,821 | 6/1981 | Pedlow | 428/215 |
| 4,273,879 | 6/1981 | Langer et al. | 521/91 |
| 4,292,358 | 9/1981 | Fryer et al. | 428/921 X |
| 4,304,079 | 12/1981 | Thorsten | 52/221 |

FOREIGN PATENT DOCUMENTS

| | | |
|---|---|---|
| 2154841 | 5/1973 | Fed. Rep. of Germany . |
| 2536565 | 2/1977 | Fed. Rep. of Germany . |
| 2847156 | 5/1980 | Fed. Rep. of Germany . |
| 1575308 | 9/1980 | United Kingdom . |
| 2077382 | 12/1981 | United Kingdom . |

OTHER PUBLICATIONS

Publications of BASF entitled "Development Product Data Sheet, ®Palusol Fireboard".

Primary Examiner—Alexander Thomas
Attorney, Agent, or Firm—Donald M. Sell; James A. Smith; Jennie G. Boeder

[57] ABSTRACT

An intumescent composite comprising a layer of intumescent sheet material having a restraining layer laminated thereto provides a superior intumescent barrier for use in sealing penetrations through floors, partitions and ceilings from smoke, fire, gas and water passage. The restraining layer causes the intumescent reaction to be generated in a directionalized manner and can be utilized to assure that the penetration cavity is optimally filled. The intumescent composite can have holes punched in it and can be used in fire protection applications where air circulation is desired. In the event of a fire, the expansion of the intumescent composite is in a direction which enable the punched holes to be quickly filled.

11 Claims, 7 Drawing Figures

0
INTUMESCENT FIRE BARRIER MATERIAL LAMINATED WITH RESTRAINING LAYER

This is a continuation of application Ser. No. 154.455 filed May 29, 1980 abandoned.

BACKGROUND OF THE INVENTION

The present invention relates to an intumescent composite comprising fire retardant materials having a restraining layer laminated thereto to dimensionally control the refractory char produced upon heating the laminated intumescent composite. The intumescent composite exists in a flexible rubbery form to the extent that it is not rigidized by the restraining layer. After exposure to intense heat or fire, the restrained composite intumesces and becomes a rigid char which has been dimensionally controlled by the restraining layer.

Prior art devices such as are disclosed in McMartin, U.S. Pat. No. 3,864,833 and Bradley et al., U.S. Pat. No. 4,061,344, have used intumescent material in the area of fire, vapor and smoke barriers. Co-pending U.S. patent application Ser. No. 54,742 relates to one type of flexible heat-expanding fire retardant composite materials with the intumescent component within an elastomeric binder. These composites have no directional control of their expansion and thus are optimally used within confined spaces. They are most effective in poke-through devices.

SUMMARY OF THE INVENTION

The present invention comprises a layer of intumescent sheet material to which a restraining layer is laminated. Intumescent composites which are laminated with restraining layers have been shown to exhibit dramatically different expansion properties when compared to unrestrained intumescent sheets. It has been unexpectedly found that when a intumescent composite of the present invention is heated or burned in a fire at a temperature greater than about 110° C., expansion of the composite occurs in a controlled directionalized manner. The intumescing composite expands in a direction substantially perpendicular to the restraining layer rather than expanding isotropically as would be the case with an unrestrained intumescent sheet.

The composites of the present invention, in conjunction with suitable application methods, provide a superior intumescent barrier for use in sealing penetrations through walls, floors, partitions and ceilings from smoke, fire, gas and water passage, since the char formed during the intumescent reaction can be generated in a directionalized manner to assure that the penetration cavity is optimally filled. In addition, the ability of the composites of the present invention to expand, when exposed to heat or fire, in a directionalized manner so as to optimally fill penetrations, allows for lower cost fire protection devices.

In addition, the intumescent composites of the present invention can have holes punched in them and can be used in fire protection applications where air circulation is desired. In the event of a fire, the direction of expansion of the intumescent composite is controlled by the restraining layer, so that the holes are filled and an effective fire barrier is provided.

DETAILED DESCRIPTION OF THE INVENTION

Referring now more particularly to the drawings, the composite, in its simplest form, comprises a sheet 11 of intumescent material with a restraining layer 12 laminated thereto. The preferred intumescent sheet material 11 is a flexible heat-expanding, fire retardant composition comprising an intumescent component in granular form such as hydrated alkali metal silicate, an organic binder component, an organic char-forming component such as phenolic resin and fillers. Such a composition is disclosed in commonly assigned co-pending application U.S. Ser. No. 54,742. This composition is a flexible rubbery material in its unexpanded state, but once subjected to temperatures on the order of 110° C. and higher, intumesces up to 10 times its original volume and becomes a rigid char which is capable of sealing penetrations in which it is contained against the passage of smoke, vapors and water. Of course, other intumescent materials such as Palusol ® commercially available from BASF, and Expantrol ® commercially available from the 3M company can be satisfactorily utilized and fall within the scope of the present invention.

The following requirements for restraining layer 12 have been determined:

(1) it should not decompose or soften before the underlying intumescent sheet material has had a chance to expand, i.e., it should withstand temperatures of about 150° C. before it begins to soften or degrade;

(2) it should have sufficient tensile strength to resist tearing during expansion of the intumescent sheet material; and (3) it should be bondable to the underlying intumescent sheet and resist delamination throughout the expansion process.

Restraining layer materials that meet the above criteria include metal foils, sheets, and screens made from aluminum, copper, steel, and lead; heavy paper and cardboard such as Kraft-type paper; high temperature rubber and plastic sheets such as are made from silicones and epoxies; screen and cloth made from inorganic fibers such as fiberglass, and high temperature organic fibers such as aramid.

Bonding of the restraining layer to the intumescent sheet material is preferably accomplished by laminating the restraining layer to the intumescent sheet prior to vulcanization of the preferred rubbery intumescent material. Vulcanization of the restrained intumescent composite results in a strong bond being formed between the restraining layer and the intumescent sheet. Alternatively, certain cements and adhesives which have adhesive-softening points above the temperature at which the intumescent material expands, can be satisfactorily utilized. Exemplary cements and adhesives include those made from silicones and epoxies.

To demonstrate the effectiveness of the restraining layer in directionalizing the expansion of the intumescent sheet, the following tests were run and are illustrated in FIGS. 4–7.

Figure 4:
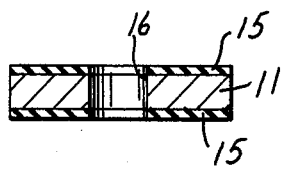
FIG. 4 is an enlarged sectional view of a disc comprising intumescent sheet material coated with a nonrestraining layer.
Figure 6:
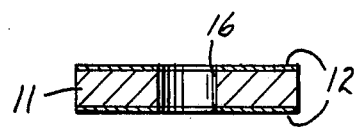
FIG. 6 is an enlarged sectional view of a disc comprising the intumescent composite of the present invention.
Figure 5:
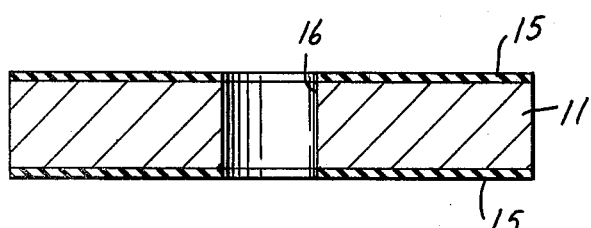
FIG. 5 is an enlarged sectional view of the disc of FIG. 4, after it has intumesced.
Figure 7:
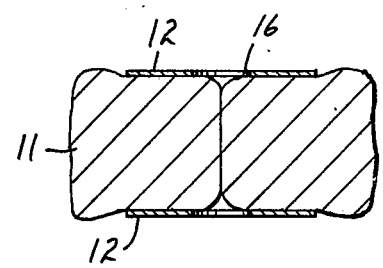
FIG. 7 is an enlarged sectional view of the disc of FIG. 6, after it has intumesced.

Discs were made of 6.35 mm thick intumescent sheet material 11 prepared according to U.S. Ser. No. 52,742. The intumescent sheet material comprised about 25 percent by weight polychloroprene commercially available as Neoprene ® from DuPont, about 56 percent by weight hydrous sodium polysilicate commercially available as "Britesil H24" from Philadelphia Quartz Co., about 11 percent by weight phenolformaldehyde commercially available as "Varcum 5485" from Reichhold Chem, Co., and about 8 percent by weight silica commercially available as "Min-U-Sil" from Pennsylvania Sand and Glass Co., which had been compounded in a Banbury mixer, milled together to a flexible rubbery composition, and sheeted out. Each disc was 50.8 mm in outside diameter and a 10.2 mm diameter center hole 16 was cut in each. The intumescent disc in FIG. 4 was vulcanization bonded, i.e., bonded during the vulcanization process, on both sides with a 0.127 mm Neoprene ® rubber coating 15. This rubber coating is non-restraining, since it softens in the same temperature range as the intumescent sheet. The intumescent disc in FIG. 6 was vulcanization bonded on both sides with a restraining layer of 0.064 mm aluminum foil 12. Both discs were expanded at 350° C. for 15 minutes in an air oven. The overall volumetric expansion for the disc of FIG. 4, illustrated after expansion in FIG. 5, was 10.3X. The corresponding amount of expansion for the disc of FIG. 6, illustrated after expansion in FIG. 7, was 9.3X. The expanded char shown in FIG. 5, intumesced substantially uniformly in all directions from its unexpanded state shown in FIG. 4. However, quite dramatically, the expanded char shown in FIG. 7, which had been restrained with a vulcanization bonded layer of aluminum foil 12, completely closed off the hole 16 and expanded substantially in the direction perpendicular to the restraining layer. Expansion in a direction perpendicular to the restraining layer was 4.5X for the restrained composite as opposed to 2.7X for the unrestrained composite. These tests illustrate that the restraining layer 12 was quite effective in directionalizing the expansion of the intumescent composite, enabling the punched hole to be filled. These tests also illustrate that the restrained intumescent composite, when fired, expands substantially in a direction perpendicular to the plane of the restraining layer.

Applicants have unexpectedly found that when the restrained intumescent composite structure of the present invention is heated or burned at a temperature greater than about 110° C. expansion occurs in a controlled, directionalized manner. During heating the intumescent composite becomes soft and the gas generated in the intumescent process expands the composite. While Applicants do not wish to be bound by any theory, it is thought that the restraining layer 11 prevents gas passage and forces the gas in the intumescing composite to be relieved two dimensionally, i.e., perpendicularly to the restraining layer rather than expanding isotropically as would be the case with an unrestrained intumescent sheet.

Figure 1:
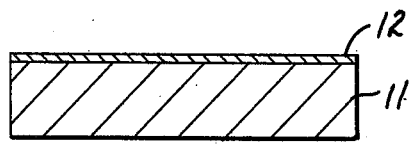
FIG. 1 is an enlarged sectional view of the intumescent composite of the present invention.
Figure 2:
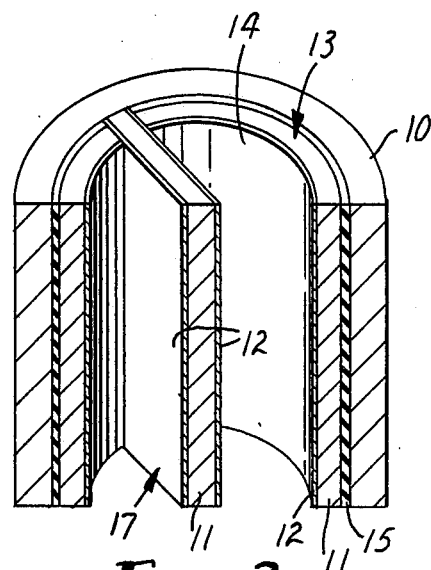
FIG. 2 is an exploded perspective view of one embodiment of a fire barrier device using the intumescent composite of the present invention with parts thereof shown in section.

A particularly preferred use of the composite of the present invention is disclosed in commonly assigned co-pending U.S. patent application Ser. No. 154,456 entitled "Fire Barrier Device", filed of even date herewith (attorney's File No. 31700), incorporated herein by reference. FIG. 2 partially illustrates an embodiment of the device disclosed in the above-described patent application, utilizing the restrained intumescent composite of the present invention.

Referring now more particularly to FIG. 2, intumescent composite 13 is a flat sheet intumescent material 11 having a restraining layer 12 such as that disclosed by the present invention laminated to one side, and an elastomeric material 15 such as Neoprene ® rubber coated on the other side. The elastomeric coating need not be a restraining layer and is utilized to reduce degradation of the intumescent sheet material by moisture. Composite 13 is cut into a parallelogram configuration and helically wrapped to form a sleeve which conforms to the interior of the cylindrical pentration 10. A partition 17 is provided in the device of FIG. 2 and comprises intumescent material 11 having a restraining layer 12 laminated to both sides. The expansion direction of the intumescent composite is effectively controlled by restraining layer 12. For example, upon exposure to temperatures of above about 110° C., composite 13 and partition 17 expand substantially perpendicular to the plane of restraining layer 12 such that the interior of penetration 14 is filled with the expanded composite.

Figure 3:
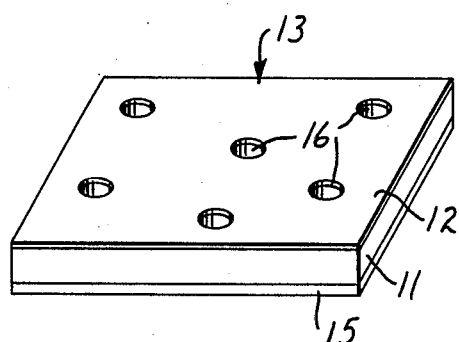
FIG. 3 is an enlarged sectional view of one embodiment of the intumescent composite of the present invention.

In certain industrial and utility plants, especially nuclear power plants, it is necessary to fire protect power and process control cables used in running the plant. For example, nuclear power plants require redundant sets of control cables carried in cable trays, and each set of control cables must be individually protected for one hour so that the cables do not short out in the event of a fire. Present systems utilize ceramic fibers or refractory boards to insulate the cable trays. When these products are used to wrap a tray, they trap the heat generated in the cables making it necessary to derate (lower the amperage of) the cables. Use of the composite of the present invention as an enclosure for cable trays reduces the degree to which it is necessary to derate the cables. A layer of the composite 13 with small holes 16 in it, as illustrated in FIG. 3, can be wrapped around a tray and allows for free circulation of cooling air, thus avoiding severe derating problems. In the event of a fire, the holes 16 are quickly sealed off by the expanding char since the char is generated in a direction so as to fill the punched holes. The composite illustrated in FIG. 3, has a nonrestraining elastomeric layer 15 on one side to reduce degradation of the intumescent sheet material 11 by moisture, and a restraining layer 12 laminated to the other side. When the composite is wrapped around a cable tray, the elastomeric layer is closest to the tray and the restrained layer is on the exterior of the wrapped cable tray.

The following example illustrates the effectiveness of the restraining layer in directionalizing the expansion of the intumescent sheet.

EXAMPLE 1

4.06 mm thick intumescent sheet material was prepared and divided into four lots.

The intumescent sheet material comprised about 25 percent by weight polychloroprene commercially available as Neoprene ® W from DuPont, about 56 percent by weight hydrous sodium polysilicate commercially available as "Britesil H24" from Philadelphia Quartz Co., about 11 percent by weight phenolformaldehyde commercially available as "Varcum 5485" from Reichhold Chem. Co., and about 8 percent by weight silica commercially available as "Min-U-Sil" from Pennsylvania Sand and Glass Co., which had been compounded in a Banbury mixer, milled together to a flexible rubbery composition, and sheeted out. In each lot a different layer was bonded to the sheet. In the first lot, a nonrestraining layer of 0.127 mm Neoprene ® rubber was laminated and heat (vulcanization) bonded to both sides of the 4.06 mm thick intumescent sheet. In the second lot a restraining layer of 0.25 mm thick Yorkite ® paper was laminated and heat (vulcanization) bonded to both sides of the intumescent sheet. In the third lot, a restraining layer of 0.025 mm aluminum foil was heat bonded to both sides of the intumescent sheet. The fourth lot had a restraining layer of 0.064 mm aluminum foil heat bonded to both sides. From each lot five partitions were cut, 114×178 mm in size. The five partitions from each lot were fit into a rectangular penetration, 102×114 mm, cut into a 127 mm thick concrete slab. The 114 mm length of each partition was inserted parallel to the 114 mm side of the concrete opening and the five partitions divided the penetration into six equal parts. Nine 6.35 mm diameter cables were run through the device between the partitions. The concrete slab was placed upon a gas fired kiln and the device heated to 927° C. in approximately one hour. Temperature measurements were made of the furnace temperature and the temperature at the center of the penetration at the concrete level. All four lots were tested in the above manner. Results are shown in Table 1 and clearly indicate the superiority of the intumescent sheet laminated with a restraining layer as herein defined.

TABLE 1

| Number | Laminated Layer | Temperature 1 hour (°C.) Furnace | Temperature 1 hour (°C.) Surface | Percent Penetration Filled |
| --- | --- | --- | --- | --- |
| 1 | Neoprene ® | 927 | 127 | 60 |
| 2 | Yorkite ® paper | 927 | 35 | 95 |
| 3 | 0.025 mm Aluminum | 927 | 21 | 99 |
| 4 | 0.064 mm Aluminum | 927 | 71 | 95 |

What is claimed is:
1. A flexible intumescent composite for use in sealing penetrations through walls, floors, partitions and ceilings comprising in laminate combination:
  (a) a first restraining layer;
  (b) a layer of intumescent sheet material; and (c) a second restraining layer;
said composite constructed so that said first restraining layer forms one major exterior surface of said intumescent composite and said second restraining layer forms the other major exterior surface of said intumescent composite, said intumescent material being capable of expansion when subjected to elevated temperatures, and wherein said restraining layers:
  (a) will not decompose or soften before the intumescent sheet material has had a chance to expand;
  (b) have sufficient tensile strength to resist tearing during expansion of the intumescent sheet material; and
  (c) are bondable to the intumescent sheet and resist delamination throughout the expansion process;
when said composite is subjected to temperatures over about 110° C., wherein said restraining layers will withstand temperatures of about 150° C. before beginning to soften or degrade, and wherein said restraining layers are:
  (1) metal foil which is up to 0.064 mm thick;
  (2) metal screen;
  (3) heavy paper or cardboard;
  (4) a high temperature rubber sheet;
  (5) a high temperature plastic sheet;
  (6) screen made from inorganic fibers;
  (7) cloth made from inorganic fibers;
  (8) screen made from high temperature organic fibers; or
  (9) cloth made from high temperature organic fibers;
and wherein said intumescent composite has sufficient flexibility to allow said intumescent composite to be helically wrapped so as to fit into cylindrical penetrations or be wrapped around cable trays.
2. The composite of claim 1 wherein said intumescent material comprises a hydrated alkali metal silicate intumescent component.
3. The composite of claim 1 wherein said composite has a plurality of small holes punched therethrough.
4. An intumescent enclosure for cable trays comprising the intumescent composite of claim 3 wrapped around said cable tray.
5. A method of controlling the expansion direction of an intumescent sheet material contained in an intumescent composite when said composite is subjected to elevated temperatures, said composite comprising in laminate combination:
  (a) a first restraining layer;
  (b) a layer of intumescent sheet material; and
  (c) a second restraining layer;
said method comprising constructing said composite so that said first restraining layer forms one major exterior surface of said composite and said second restraining layer forms the other major exterior surface of said composite, wherein said restraining layers:
  (a) will not decompose or soften before the intumescent sheet material has had a chance to expand;
  (b) have sufficient tensile strength to resist tearing during expansion of the intumescent sheet material; and
  (c) are bondable to the intumescent sheet and resist delamination throughout the expansion process;
when said composite is subjected to temperatures over about 110° C., wherein said restraining layers will withstand temperatures of about 150° C. before beginning to soften or degrade and wherein said restraining layers are
  (1) metal foil which is up to 0.064 mm thick;
  (2) metal screen;
  (3) heavy paper or cardboard;
  (4) a high temperature rubber sheet;
  (5) a high temperature plastic sheet;
  (6) screen made from inorganic fibers;
  (7) cloth made from inorganic fibers;
  (8) screen made from high temperature organic fibers; or
  (9) cloth made from high temperature organic fibers.
6. An article comprising in combination:
  (a) a flexible intumescent composite; and
  (b) in juxtaposition to one major exterior surface of said composite, a restraining substrate;

said intumescent composite comprising in laminate combination:
  (a) a layer of intumescent sheet material; and
  (b) a restraining layer;
said composite constructed so that said restraining layer forms that major exterior surface of said composite which is not in juxtaposition to said restraining substrate; said intumescent material being capable of expansion when subjected to temperatures over about 110° C. and wherein said restraining layer and said restraining substrate:
  (a) will withstand temperatures of about 150° C. before beginning to soften or degrade;
  (b) have sufficient tensile strength to resist tearing during expansion of the intumescent sheet material; and
  (c) are bondable to the intumescent sheet and resist delamination throughout the expansion process;
and wherein said restraining layer is:
  (1) metal foil which is up to 0.064 mm thick;
  (2) metal screen;
  (3) heavy paper or cardboard;
  (4) a high temperature rubber sheet;
  (5) a high temperature plastic sheet;
  (6) screen made from inorganic fibers;
  (7) cloth made from inorganic fibers;
  (8) screen made from high temperature organic fibers; or
  (9) cloth made from high temperature organic fibers;
and wherein said intumescent composite has sufficient flexibility to allow said intumescent composite to be helically wrapped so as to fit into cylindrical penetrations or be wrapped around cable trays.

7. The article of claim 6 wherein said intumescent sheet material comprises a hydrated alkali metal silicate intumescent component.

8. The article of claim 6 wherein said intumescent composite has a plurality of small holes punched therethrough.

9. The article of claim 8 wherein said restraining substrate is a cable tray and said intumescent composite is placed in juxtaposition to said cable tray by wrapping said intumescent composite around said cable tray.

10. The article of claim 6 wherein said restraining substrate is a penetration in a wall, floor or ceiling, and said intumescent composite is placed in juxtaposition to said penetration by wrapping said intumescent composite so that it fits into said penetration.

11. A method of sealing penetrations through walls, floors, partitions and ceilings against the passage of smoke or fire comprising placing an intumescent composite into said penetrations in such a way that at least one major exterior surface of said intumescent composite is in juxtaposition to the walls of said penetration; said intumescent composite comprising in laminate combination:
  (a) a layer of intumescent sheet material; and
  (b) a restraining layer; said composite constructed so that said restraining layer forms that major exterior surface of said composite which is not in juxtaposition to the walls of said penetration, said intumescent material being capable of expansion when subjected to temperatures over about 110° C., and wherein said restraining layer and said walls of said penetration:
  (a) will withstand temperatures of about 150° C. before beginning to soften or degrade;
  (b) having sufficient tensile strength to resist tearing during the expansion of the intumescent sheet material; and
  (c) are bondable to the intumescent sheet and resists delamination throughout the expansion process;
and wherein said restraining layer is:
  (1) metal foil which is up to 0.064 mm thick;
  (2) metal screen;
  (3) heavy paper or cardboard;
  (4) a high temperature rubber sheet;
  (5) a high temperature plastic sheet;
  (6) screen made from inorganic fibers;
  (7) cloth made from inorganic fibers;
  (8) screen made from high temperature organic fibers; or
  (9) cloth made from high temperature organic fibers.

* * * * *

UNITED STATES PATENT AND TRADEMARK OFFICE
CERTIFICATE OF CORRECTION

PATENT NO. : 4,467,577
DATED     : August 28, 1984
INVENTOR(S) : Richard R. Licht It is certified that error appears in the above-identified patent and that said Letters Patent is hereby corrected as shown below:

Col. 1, line 23, "54,742" should read -- 52,742 --.

Col. 1, line 38, "a" should read -- an --.

Col. 2, line 31, "54,742" should read -- 52,742 --.

Col. 3, line 15, "Neoprene®" should read -- Neoprene® W --.

Signed and Sealed this

Twenty-seventh Day of August 1985

[SEAL]

Attest:

DONALD J. QUIGG

Attesting Officer

Acting Commissioner of Patents and Trademarks